Figure 1:
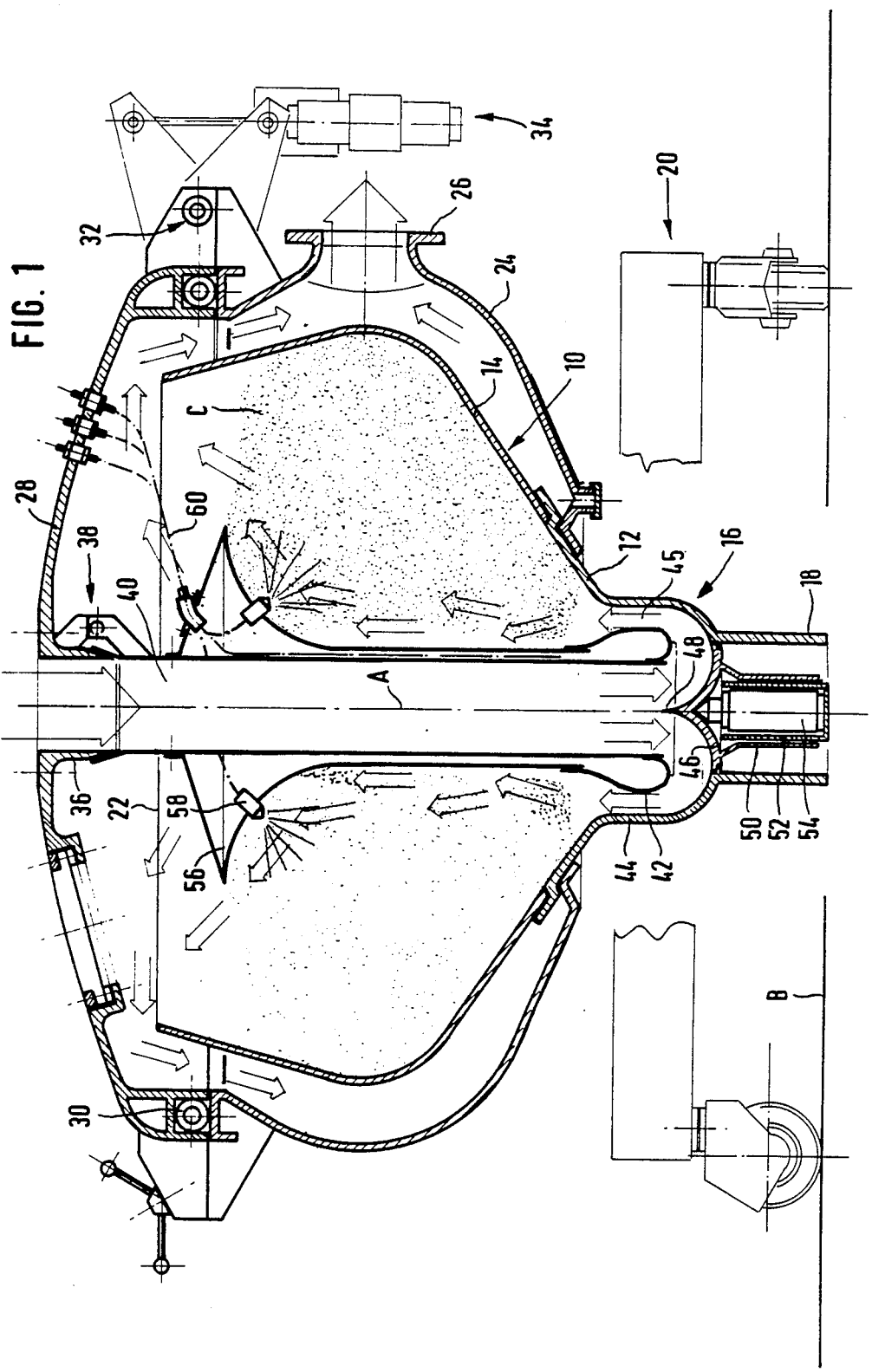

United States Patent [19]

Hüttlin

[11] Patent Number: 4,685,809
[45] Date of Patent: Aug. 11, 1987

[54] FLUIDIZED BED APPARATUS

[76] Inventor: Herbert Hüttlin, Lörracher Strasse 14, 7853 Steinen, Fed. Rep. of Germany

[21] Appl. No.: 790,758

[22] Filed: Oct. 22, 1985

Related U.S. Application Data

[63] Continuation of Ser. No. 532,171, Sep. 14, 1983, abandoned.

[30] Foreign Application Priority Data

Sep. 21, 1982 [DE] Fed. Rep. of Germany ....... 3234911

[51] Int. Cl.$^4$ .................. B01F 13/02; B01F 15/02; F26B 17/10
[52] U.S. Cl. ................................. 366/101; 34/57 A; 366/173; 366/192
[58] Field of Search ............... 366/101, 165, 167, 173, 366/185, 192, 193; 118/19, 24, 62, 303; 222/195; 34/57 A, 57 R, 57 E, 241

[56] References Cited

U.S. PATENT DOCUMENTS

| | | | |
|---|---|---|---|
| 2,786,280 | 3/1957 | Gishler et al. | 366/101 X |
| 3,204,942 | 9/1965 | Matthys | 366/101 X |
| 3,334,868 | 8/1967 | Lage | 366/101 |
| 3,385,724 | 5/1968 | Grün. | |
| 3,386,182 | 6/1968 | Lippert | 118/303 |
| 3,411,480 | 11/1968 | Grass, Jr. | 118/62 |
| 4,002,325 | 1/1977 | Herfeld | 366/101 |
| 4,050,406 | 9/1977 | René | 118/19 |
| 4,168,914 | 9/1979 | Larson et al. | 366/101 |
| 4,217,851 | 8/1980 | Biehl | 118/19 |
| 4,425,865 | 1/1984 | Hörner | 118/62 |
| 4,466,082 | 8/1984 | Zoschak et al. | 366/101 |
| 4,587,744 | 5/1986 | Huttlin | 366/101 X |

FOREIGN PATENT DOCUMENTS

| | | |
|---|---|---|
| 872928 | 2/1953 | Fed. Rep. of Germany. |
| 38538 | 1/1960 | Fed. Rep. of Germany. |
| 1849891 | 2/1962 | Fed. Rep. of Germany. |
| 1297447 | 6/1969 | Fed. Rep. of Germany. |
| 1577729 | 9/1969 | Fed. Rep. of Germany. |
| 1632404 | 8/1970 | Fed. Rep. of Germany. |
| 2299903 | 3/1976 | France ....................... 366/101 |
| 264592 | 10/1949 | Switzerland. |
| 2043219A | 10/1980 | United Kingdom. |

Primary Examiner—Harvey C. Hornsby
Assistant Examiner—Scott J. Haugland
Attorney, Agent, or Firm—Brumbaugh, Graves, Donohue & Raymond

[57] ABSTRACT

A central immersion pipe (40) projects from above into a receptacle (10) which is axially symmetrical in relation to a perpendicular receptacle axis (A) and has an annular lower portion (12) with downwardly decreasing diameter. The lower portion (12) leads into a basin (16) which is likewise axially symmetrical in relation to the receptacle axis (A). At the lower end of the immersion pipe (40) is a bulge (42) which, together with the basin (16), reroutes by 180° a gas flow introduced from above through the immersion pipe (40) so that the gas, for example, warm dry air, flows upwards in a tubular flow formation around the immersion pipe (40) and fluidizes material (C) contained in the receptacle (10), said material being circulated with low consumption of energy.

11 Claims, 6 Drawing Figures

FLUIDIZED BED APPARATUS

This is a continuation of application Ser. No. 532,171, filed Sep. 14, 1983 now abandoned.

The invention relates to a fluidised bed apparatus for mixing, drying, granulating, pelleting, coating and/or sugarcoating pulverulent or granular material, comprising a receptacle which is at least approximately axially symmetrical in relation to an at least approximately perpendicular receptacle axis and has a lower portion with downwardly decreasing diameter, an immersion pipe which extends axially from above into the receptacle and is adapted to be connected to a source of gas with which the material may be agitated and, in particular, fluidised in the receptacle, a basin which is disposed below the immersion pipe, is at least approximately axially symmetrical in relation to the receptacle axis and reroutes in upwards direction the gas entering through the immersion pipe, and a gas outlet.

In a known fluidized bed apparatus of this genus (DE-PS 872 928), the receptacle has a perpendicular hollow cylinder to the bottom of which is connected a steep funnel-shaped lower portion. The lower portion is closed at the bottom by a bucket-like end portion. At the top, the receptacle is closed by a lid which supports a blower. The immersion pipe is suspended from the lid, is connected to the blower, and extends axially through the cylindrical and the funnel-shaped portions of the receptacle and ends in the bucket-like end portion. The basin is suspended in the bucket-like end portion without touching its wall. Above the lower end of the immersion pipe, but still within the bucket-shaped end portion begins a tubular shell which encloses the immersion pipe with radial clearance and extends coaxially upwards with the same, ending underneath a deflector shield which is fixed underneath the lid on the immersion pipe.

In this known fluid bed apparatus, the blower circulates the air in such a manner that it flows downwards through the immersion pipe, is rerouted in upward direction in the basin, flows back through the tubular shell in upwards direction and then is deflected radially outwards by the deflector shield and outside, around said deflector shield, arrives at the blower again. The loose material contained in the receptacle slips inside the funnel-shaped lower portion downwards in the direction of the basin, carried along by the flow of air deflected upwards in the basin and carried upwards through the tubular shell where it is deflected by the deflector shield towards the outside and deposited on the surface of the loose material in order once again to slip to the bottom.

In the known fluidised bed apparatus, however, even moderately heavy loose material, is in fact, if at all, only fluidised in the area of the basin and rotated within the bucket-like end portion and at most only small amounts of the loose material arrive at the top via the tubular shell. The greater part of the loose material thus remains lying practically motionless in the receptacle so that the desired rearrangement, loosening and, as the case may be, other treatment of the loose material, cannot occur, or at least cannot occur to the desired extent. This cannot be changed either by the fact that the receptacle is of narrow construction to assist sliding of the material and has a correspondingly substantial overall height which is considerably larger than the largest receptacle diameter. When the filling height is correspondingly great, this substantial overall height even increases the danger that the material will block the tubular shell inlet and as a result fluidisation will not even take place in the bucket-like end portion.

It is, therefore, an object of the present invention to develop a fluidised bed of the type described initially to circulate the pulverulant or granular material to be treated in a reliable and thorough manner and requiring a lesser overall height at a given receptacle volume adapted to the desired throughput.

This object is met according to the invention in that the lower portion of the receptacle leads into a substantially cylindrical wall of the basin, and the immersion pipe is immersed in the basin in such a manner that a narrow annular space is formed between immersion pipe and cylindrical wall.

The gas flow is directed centrally through the immersion pipe in the downward direction and is transformed by the cylindrical wall of the basin in the relatively narrow annular space into an upward flow with a annular cross-section, said upward flow effecting a steady circulation of the material contained in the receptacle. When the velocity of the gas flow is sufficient, this circulation takes on the form of a complete fluidisation of the material. The material is carried upwards by the gas flow in the area arround the central immersion pipe, flows radially outwards and along the downwardly converging receptacle wall to arrive once again in the proximity of the basin in order there to be carried anew in upwards direction.

A tubular shell, which could provoke blockage, is therefore not necessary. The material is thoroughly fluidised in the narrow annular space and with certainty carried upwards. The overall height of the receptacle is slight for the simple reason that the lower portion of the receptacle leads directly into the cylindrical wall of the basin.

Due to the fluidisation of the entire content of the receptacle or at least a large part thereof, which is to be achieved according to the invention, the lower portion of the receptacle needs to have only a relatively slight incline; this also contributes to keeping the overall height of the entire apparatus down.

It is expedient if the annular space is defined radially inwards by a lower bulge of the immersion pipe. This assists the rerouting of the gas flow in the basin; the shape of the bulge allows the velocity of flow in the area of the upper edge of the basin at a given gas throughput per unit of time to adjust such that it is sufficient for the fluidisation of the material.

The bulge can be formed by an inflatable tubing disposed around the immersion pipe. This development has the advantage that the flow conditions in the basin can be changed during operation by inflating the tubing to a greater or lesser degree. Expediently, the tubing can be inflated to such an extent that it joins with the basin and thus prevents the material from flowing into the basin during interruption of operations.

The height of the annular space determined by the immersion depth of the immersion pipe in the basin is approximately as large as or larger than the inner diameter of the immersion pipe at its lower end portion. This ensures sufficient guidance of the upwardly flowing gas even under difficult conditions.

The narrowest cross-sectional area of the annular space is preferably approximately as large as or smaller than the inner cross-sectional area of the immersion pipe at its lower end portion.

In conformity with the known apparatus according to the genus, an at least approximately axially symmetrical deflector shield can be disposed at a distance above the basin around the immersion pipe and reroute in outward direction the material carried upwards by the gas. According to the invention, the deflector shield is preferably sieve-like so that the gas used to fluidise the material, having largely lost its energy of flow in the area of the deflector shield, can flow off upwards, substantially unhindered, through the deflector shield. The gas thus does not need to circumvent the deflector shield, or at least only needs partially to do so; this avoids the gas flowing off from the receptacle with too great a velocity in an annular zone lying radially outside the deflector shield. When the deflector shield is sieve-like, it can extend completely over the space between the immersion pipe and an upper edge of the receptacle. In this case, the space within the receptacle which can receive the material is also upwardly completely limited.

Independently of, but preferably in addition to the described formation of a bulge on the lower end of the immersion pipe, the rerouting of the gas by preferably 180° can be assisted by the construction of the basin. Preferably, the basin has an upwardly projecting central floor area which reduces the loss of flow on impact of the gas with the basin, as in the known apparatus. According to the invention, the central floor area of the basin can form a closing means adjustable in height for a discharge outlet.

Instead of such a discharge outlet, the basin can have a tangentially projecting discharge pipe below its cylindrical wall.

The basin can have on its cylindrical wall inwardly projecting guide vane-like projections between which the immersion pipe is centered and the gas flow is guided. The projections can be formed such that they cause the gas flow to twist. As a result, the turbulence of the material contained in the receptacle can be additionally assisted.

The fluidised bed according to the invention preferably has a spray device for wetting or coating the material or for introducing substances which first of all form the material. A spray device of this type according to the invention preferably has several nozzles which are arranged closely above the narrow annular space of the basin around the immersion pipe. Such nozzles are preferably arranged on the annular end portion of the receptacle but can also be arranged on the bulge of the immersion pipe.

Examples of embodiments of the invention are described below with reference to the accompanying diagrammatic drawings showing further details. FIGS. 1 to 5 each show axial sections of five different embodiments of the fuidised bed apparatus according to the invention, FIG. 4a showing a detail from FIG. 4 in a discharging position.

The apparatus shown in FIG. 1 has a receptacle 10 which is axially symmetrical in relation to a perpendicular receptacle axis A and is composed of an annular lower portion 12 and a receptacle element 14. The lower portion 12 tapers conically downwards and opens out without shelf or step into a basin 16 which is likewise axially symmetrical in relation to the receptacle axis A and has an annular base 18 which, in the illustrated position, supports the entire weight of the receptacle 10 with associated structural parts and receptacle contents on a floor B. The receptacle 10 can be lifted from the illustrated position and transported by an elevating platform truck 20 of essentially normal construction.

The receptacle element 14 has a lower portion which expands from the lower portion 12 upwards with the same angle of opening as said lower portion 12 and reaches its largest diameter at about half the height of the receptacle element 14. From then onwards, the receptacle elements 14 tapers slightly towards a horizontal upper gas outlet 22.

On the lower portion 12, is also fixed a casing 24, which encloses ring-like the receptacle element 14, which terminates in a horizontal plane slightly underneath the gas outlet and which has a lateral exhaust pipe 26. The casing 24 is closed at the top by a receptacle lid 28 which curves away at a distance over the gas outlet 22 and is sealed by a tubular seal 30 against the casing 24.

Casing 24 and receptacle lid 28 are connected to each other by a hinge 32 with horizontal axis of rotation and by a pistoncylinder unit 34 arranged at a distance therefrom in such a manner that the receptacle lid may be swivelled upwards into an at least approximately perpendicular position.

The receptacle lid 28 is substantially axially symmetrical in relation to an axis which, in the illustrated closed position, coincides with the receptacle axis A, and said receptacle lid has a central intake inlet 36. An immersion pipe 40 is suspended by a hinge 38 at the intake inlet 36 in such a manner that, in the illustrated closed position of the receptacle lid 28, it aligns with the intake inlet; this means that the axis of the immersion pipe 40 also coincides with the receptacle axis A. When the receptacle lid 28 is swivelled upwards, the immersion pipe 40 moves upwards substantially in parallel to itself and approaches the hinge 32 of the receptacle lid.

In its lower end area, the immersion pipe 40 has a bulge 42 which in the example of embodiment according to FIG. 1 is formed by tubing inflatable with air. Together with a substantially cylindrical wall 44 of the basin 16, in which the immersion pipe 40 is immersed, the bulge 42 defines an annular space 45 which, by inflating the bulge to a greater or lesser degree, can be narrowed greatly and even completely closed. In every case, the diameter of the bulge 42 decreases in upward direction within the area enclosed by the wall 44 of the basin 16; on level with the upper edge of the basin, the diameter of the bulge is therefore smaller than its maximum diameter.

The height of the annular space 45, that is the depth of penetration of the immersion pipe 40 into the part of the basin 16 formed by the cylindrical wall 44, is approximately as large a the inner diameter of the immersion pipe 40 at its lower end portion. During normal operation, the cross-sectional area at the narrowest area of the annular space 45 is at most equal to the inner cross-sectional area of the immersion pipe 40 at its lower end portion.

The basin 16 as a whole is axially symmetrical in relation to the receptacle axis A and has a central floor area 46 which is inserted as separate component and has a peak 48 projecting axially upwards. On the underside of the central floor area 46, an outer guide tube 50 is formed which is guided so as to be axially slidable on an inner guide tube 52 fixed to the base 18. Inside the inner guide tube 52, a piston-cylinder unit 54 is arranged which makes it possible to lift the central floor area 46 to such an extent that this at least approximately touches the bulge 42 and this liberates a discharge outlet in the center of the basin 16. This is illustrated in FIG. 4a for the embodiment of the fluidised bed apparatus shown in FIG. 4 which otherwise differs partially from the embodiment shown in FIG. 1.

According to FIG. 1, a mushroom-shaped deflector shield 56 is fixed to the immersion pipe 40 spaced slightly below the plane of the gas outlet 22 and downwardly encasing the immersion pipe, supporting together with the latter the tubing which forms the bulge 42. In the embodiment shown in FIG. 1, the deflector shield 56 is a hollow shell which, like most of the other parts of the fluidised bed apparatus described, consists of rustproof steel. According to FIG. 1, several nozzles 58, offset from each other at regular angular distances, and directed obliquely outwards and downwards, are built into the deflector shield 56 and can be fed via supply lines 60 with liquids for wetting, coating and/or sugar-coating a material C contained in the receptacle 10.

Figure 2:
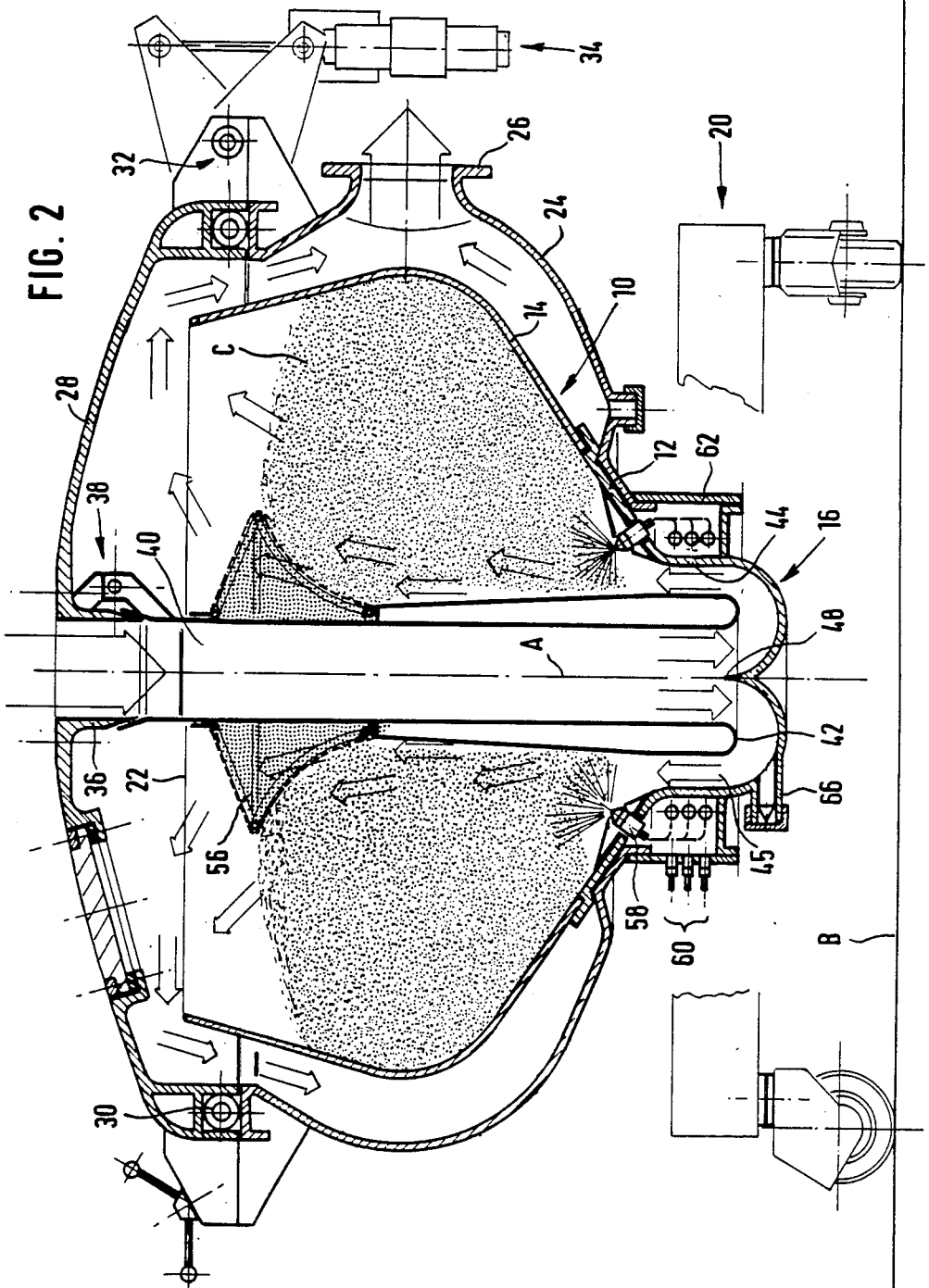

The embodiment shown in FIG. 2 differs essentially from that shown in FIG. 1 in that the bulge 42 is formed by the lower end of a substantially rigid jacket of the immersion pipe 40, both consisting of rustproof sheet steel. The bulge 42 and the jacket as a whole taper substantially evenly in upward direction. The deflector shield 56 is formed from a sieve-like perforated sheet, likewise of rustproof steel. The nozzles 58 are arranges in the annular end portion 12 of the receptacle 10, are directed obliquely inwards and upwards and are enclosed by a housing 62. A further difference as compared to FIG. 1 is that the basin 16 is in one piece and at its base has a tangentially arranged discharge pipe 66.

Figure 3:
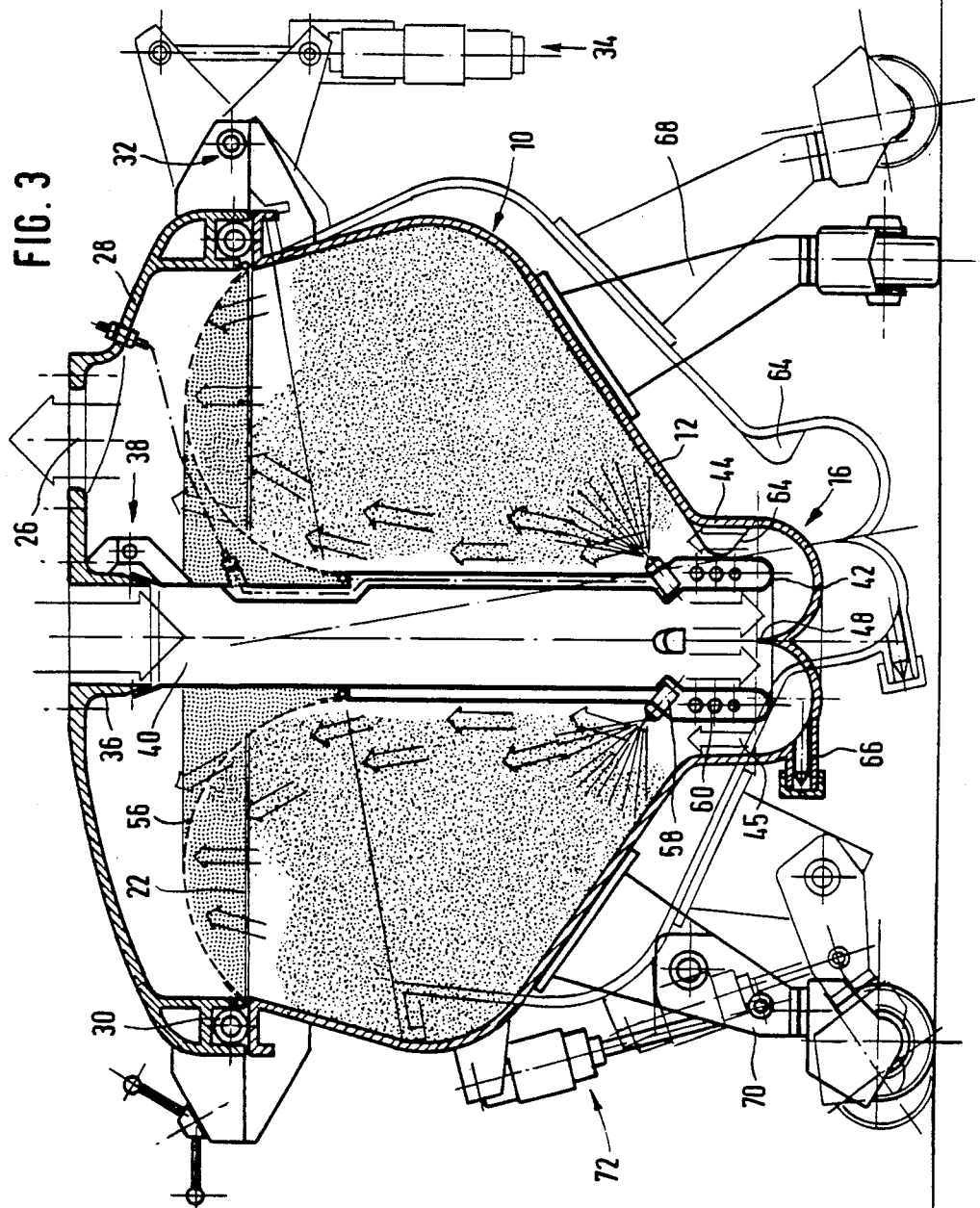
Figure 4:
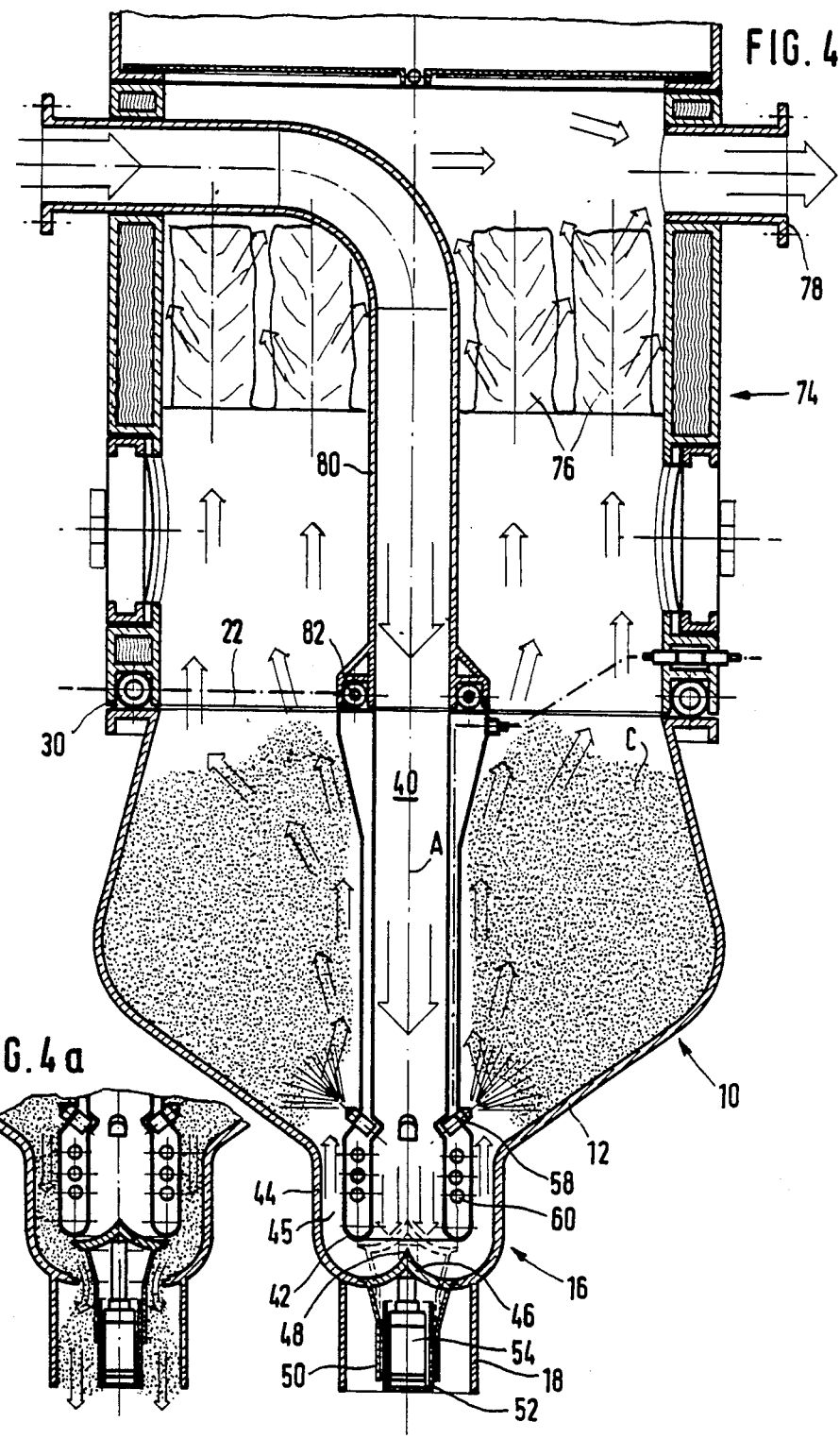

According to FIG. 3, the deflector shield 56, which is formed from a sieve-like web extends in annular form over the entire area between the immersion pipe 40 and the upper edge of the receptacle 10 which in this case is formed in one piece. The bulge 42, which is again formed by a rigid jacket of the immersion pipe 40, is centered in its shown operative position, coaxial to the basin 16, by several projections 64 which project inwards from the substantially cylindrical wall 44 of the basin 16. The projections 64 consist of sheet metal and are arranged at regular intervals around the receptacle axis A so that they act as guide vanes. The nozzles 58 are built into the upper area of the bulge 42 and are directed obliquely outwards and upwards.

The embodiment shown in FIG. 3 also differs from the two preceding embodiments in that the receptacle 10 has its own wheel frame. This consists of a pair of rigid legs 68 and a pair of legs 70 connected articulately to the receptacle 10, said legs 70 being tiltable by a piston cylinder unit 72 in such a manner that the receptacle 10, as indicated by thin lines in FIG. 3, can be tilted downwards. According to FIG. 3, there is no receptacle casing as shown in FIGS. 1 and 2; the exhaust outlet 26 or an opening corresponding thereto is thus formed in the receptacle lid 28.

To a large extent, the embodiment according to FIG. 4 is comparable with that shown in FIG. 3 as far as concerns the structure of the receptacle 10 and the components arranged therein although the deflector shield 56 is considerably less distinct. Instead of a receptacle lid, a fixed filter housing 74 is provided on to which the receptacle 10 is sealingly pressed from below, for example by means of an elevating platform truck 20 of the type shown in FIGS. 1 and 2. The filter housing 74 contains several tube filters 76 of usual construction and further above has an exhaust outlet 78. Furthermore, a central pipe 80 is fixed in the filter housing 74 and the immersion pipe 40 is suspended from this, a tubular sealing means 82 being arranged between the two.

Figure 5:
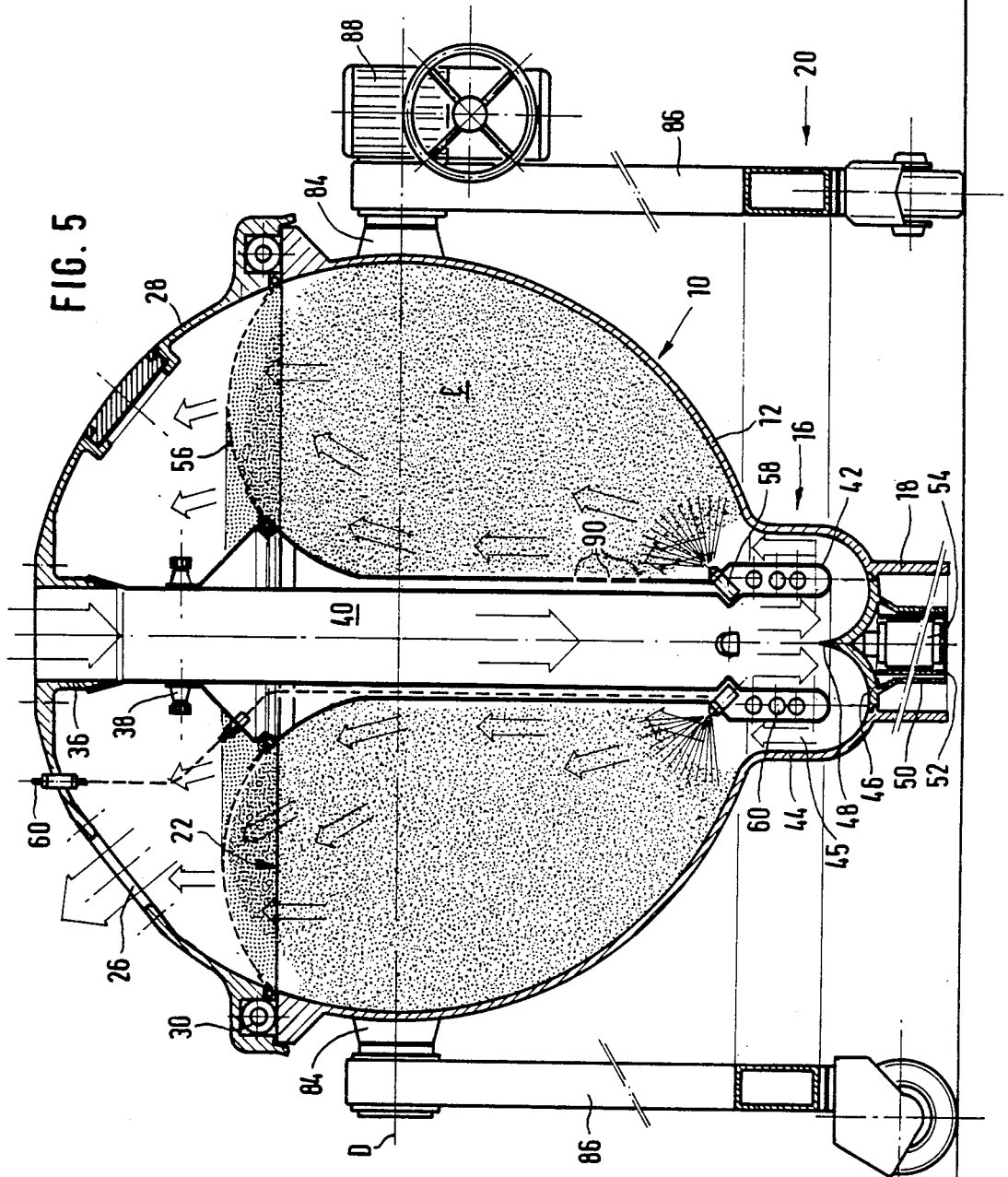

In the embodiment shown in FIG. 5, the receptacle 10, together with the receptacle lid 28, has the form of a sphere and can thus withstand a relatively great inner pressure such as can occur during a deflagration of solvents. Two diametrically opposite axle journals 84 project from the receptacle 10 and their common axis forms a horizontal axis of rotation D. The axle journals 84 are supported on legs 86 and these are mounted on an elevating platform truck 20 which otherwise corresponds to that shown in FIGS. 1 and 2. On the one leg 86, a manually driven gear unit 88 is arranged with which the receptacle 10 together with receptacle lid 28 can be swivelled around the horizontal axis D when—for example on product change—thorough cleansing is necessary.

All embodiments shown have in common that, when in operation, a gas, for example, heated dry air, is introduced from above into the immersion pipe 40, this flows downwards at a speed of, for example, 20 to 40 m/s, is rerouted in the basin 16 by approximately 180° and is guided upwards in the annular space 45. The speed of flow of the gas in the narrowest area of the annular space 45 is at least 20 m/s, preferably between 30 and 60 m/s. Accordingly, the narrowest cross-section of the annular space 45 is preferably smaller than the inner cross-section of the immersion pipe 40. If guide vane-like projections 64 of the type shown in FIG. 3 are provided, the gas is guided either with or without twist, each according to construction and arrangement of said projections 64.

The gas then flows in a relatively narrow area around the immersion pipe 40 or its jacket in upward direction and fluidises in this area at least the material C contained in the receptacle 10. Depending on the construction of the deflector shield 56, either all the gas flows around it (FIG. 1 and 4), or a greater part of the gas flows around it and a smaller part flows through it (FIG. 2), or all of the gas flows through it (FIG. 3 and 5). The gas leaves the receptacle 10 through its gas outlet 22 while the travelling material C is deflected outwardly by the deflector shield 56 and then flows along the wall of the receptacle 10 in downwards direction where it is picked up again by the flow of gas near the upper edge of the basin 16 and is carried upward in a central tube-like flow formation.

Due to the concentration of the gas flow in the area around the immersion pipe 40, or its jacket, the material C is fluidised even during a relatively slight gas or air throughput. The expenditure of kinetic energy and thermal energy required for the desired treatment of the material C is therefore slight.

After the material C has been treated, the receptacle 10 is emptied, either by lifting the central floor area 46 in the embodiments shwon in FIGS. 1, 4 and 5 and using the method shown in FIG. 4a, so that the material C trickles out of its own accord, or by opening the discharge outlet 66 shown in FIGS. 2 and 3 and the material C is conveyed pneumatically out of the receptacle 10. In the embodiment according to FIG. 5 there is also the possibility of tipping the material C out of the receptacle 10 through the open receptacle lid 28.

What is claimed is:

1. A fluidized bed apparatus for mixing, drying, granulating, pelleting, coating and/or sugar coating pulverulent or granular material, comprising:

a receptacle which is at least approximately symmetrical about a receptacle axis, said receptacle having an interior adapted to contain said material with a lower portion having a downwardly decreasing diameter terminating in a lower edge;

an immersion pipe which extends axially from above through the receptacle interior, the pipe having an exterior and upper and lower ends;

gas outlet means communicating with the receptacle interior;

means for connecting the upper end of said immersion pipe to a source of gas; and means for directing gas discharged from the lower end of said pipe upwardly into said receptacle interior, in an annular, substantially axial flow along the exterior of said immersion pipe, said means comprising a basin having a floor portion disposed below said lower end and a substantially cylindrical wall extending from the floor portion axially to the lower edge of the receptacle, said cylindrical wall being spaced radially outwardly of a lower portion of said immersion pipe and sized to define a narrow axially elongated annular space between said cylindrical wall and said immersion pipe communicating between said floor portion and said interior, said annular space having a height sufficient to direct gas exiting from said immersion pipe axially along the exterior of the pipe into the receptacle interior for fluidizing material contained therein and for entraining material substantially upwardly along the exterior of said immersion pipe.

2. The fluidised bed apparatus according to claim 1, wherein the annular space is defined radially inwards by a lower bulge in the immersion pipe.

3. The fluidised bed apparatus according to claim 2, wherein the bulge is formed by a an inflatable tubing disposed around the immersion pipe.

4. The fluidised bed apparatus according to claim 1, wherein the height of the annular space, determined by the immersion depth of the immersion pipe in the basin, is approximately as large or larger than the inner diameter of the immersion pipe at its lower end portion.

5. The fluidised bed apparatus according to claim 1, wherein the narrowest cross-sectional area of the annular space is approximately as large or smaller than the inner cross-sectional area of the immersion pipe at its lower end portion.

6. The fluidised bed apparatus according to claim 1, in which, at a distance above the basin and around the immersion pipe, an at least approximately axially symmetrical deflector shield is disposed which reroutes towards the outside material carried upwards by the gas, wherein the deflector shield is sieve-like.

7. The fluidised bed apparatus according to claim 1, wherein the basin has an upwardly projecting central floor area, forming a closing means adjustable in height for opening and closing a discharge outlet.

8. The fluidised bed apparatus according to claim 1, wherein the basin has a tangentially projecting discharge pipe below its cylindrical wall.

9. The fluidised bed apparatus according to claim 1, wherein the basin has, on its cylindrical wall, guide vane-like projections between which the immersion pipe is centered and the gas flow is guided.

10. The fluidised bed apparatus according to claim 1, comprising a spray device for wetting or coating the material or for introducing substances which first of all form the material, wherein the spray device has several nozzles which are arranged closely above the narrow annular space of the basin around the immersion pipe.

11. The fluidised bed apparatus according to any one of claims 1 to 10, wherein said receptacle is spherical.

* * * * *